United States Patent
Joudrey

(10) Patent No.: US 12,272,016 B2
(45) Date of Patent: Apr. 8, 2025

(54) GENERATE A SIMPLIFIED VERSION OF A USER-GENERATED DIGITAL OBJECT

(71) Applicant: VRChat Inc., San Francisco, CA (US)

(72) Inventor: Jesse Joudrey, Port Coquitlam (CA)

(73) Assignee: VRChat Inc., San Francisco, CA (US)

( * ) Notice: Subject to any disclaimer, the term of this patent is extended or adjusted under 35 U.S.C. 154(b) by 357 days.

(21) Appl. No.: 17/735,637

(22) Filed: May 3, 2022

(65) Prior Publication Data
US 2023/0360345 A1    Nov. 9, 2023

(51) Int. Cl.
G06T 19/20    (2011.01)
G06T 15/20    (2011.01)

(52) U.S. Cl.
CPC .............. *G06T 19/20* (2013.01); *G06T 15/20* (2013.01); *G06T 2219/2004* (2013.01); *G06T 2219/2008* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 5,909,218 A * | 6/1999 | Naka | H04N 21/44012 375/E7.006 |
| 8,964,052 B1 * | 2/2015 | Wooley | H04N 5/2621 348/211.3 |
| 11,030,442 B1 * | 6/2021 | Bergamo | G06F 18/214 |
| 2010/0182329 A1 * | 7/2010 | Yamaguchi | G06T 13/40 345/474 |
| 2020/0193591 A1 * | 6/2020 | Kamiyama | G06T 7/60 |
| 2021/0049811 A1 * | 2/2021 | Fedyukov | G06T 7/60 |
| 2023/0222830 A1 * | 7/2023 | Lopez | G06V 10/82 382/154 |

* cited by examiner

Primary Examiner — Sultana M Zalalee
Assistant Examiner — Jonathan M Cofino
(74) Attorney, Agent, or Firm — Polsinelli PC

(57) ABSTRACT

The present technology generates a simplified version of a complex avatar by capturing images and 3-D volume information of segments of the complex avatar while the complex avatar is rendered. When the complex avatar is requested in an environment in which it is not desirable to display the complex avatar, the captured images and 3-D volume information can be used to provide a simplified version of the avatar. The simplified version of the avatar can have a similar visual appearance but can be easier to render. However, the present technology permits the user with the complex avatar to continue to have approximately the same visual appearance while avoiding the degraded performance on systems not capable of rendering the complex avatar quickly enough.

18 Claims, 11 Drawing Sheets

```
┌─────────────────────────────────────────────────────────────────────────┐
│           RENDERING THE COMPLEX AVATAR IN A SECOND POSE 420             │
└─────────────────────────────────────────────────────────────────────────┘
                                    ↓
┌─────────────────────────────────────────────────────────────────────────┐
│  RECAPTURING THE IMAGES OF THE ISOLATED SEGMENTS OF THE COMPLEX AVATAR IN THE │
│                            SECOND POSE 422                              │
└─────────────────────────────────────────────────────────────────────────┘
```

FIG. 4B

GENERATE A SIMPLIFIED VERSION OF A USER-GENERATED DIGITAL OBJECT

BACKGROUND

Users of computing systems utilize avatars to stand in for their physical presence in a variety of applications ranging from simple chat applications to elaborate three-dimensional (3D) environments used in video game applications and virtual reality applications. A simple version of an avatar could be a shape of the shoulders and a head without any distinguishing features. Other avatars can include animated versions of a being. These avatars do not need to be in a humanoid form. Some avatars can be complex and can be associated with detailed graphics, and textures, and can be capable of various animations. As avatars become more elaborate, so too does the computing power to render the avatar.

BRIEF DESCRIPTION OF THE SEVERAL VIEWS OF THE DRAWINGS

The advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4B illustrates an example method for creating a simplified version of a complex avatar in alternate poses in accordance with some aspects of the present technology.

DETAILED DESCRIPTION

Figure 1:
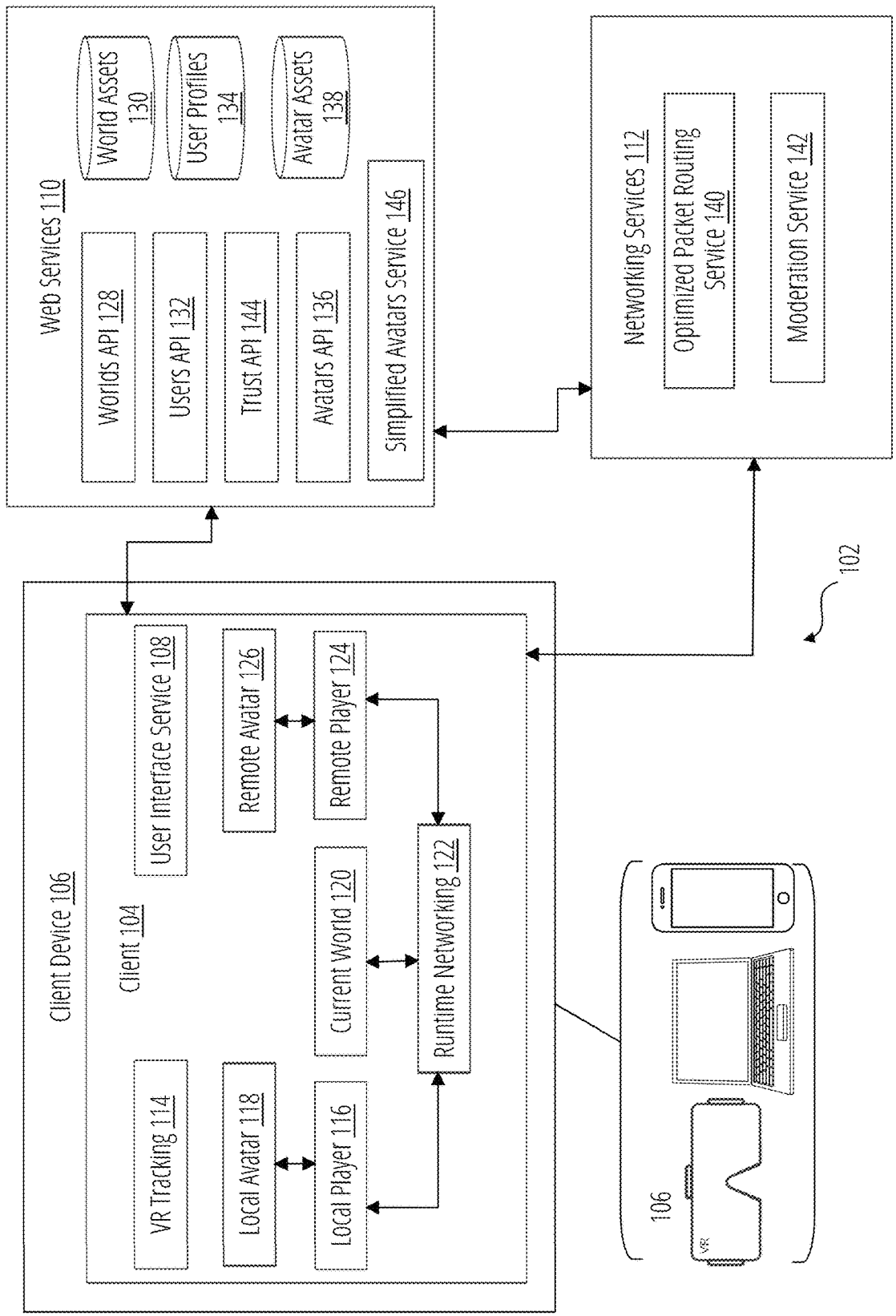
FIG. 1 illustrates an example virtual world platform for playing and hosting a multiplayer virtual reality (VR) experience in accordance with some aspects of the present technology.

Some avatars can be complex and associated with detailed graphics, textures, scripts, and they can be capable of various animations. As avatars become more elaborate, so does the computing power required to render the avatar.

Generally, more complex avatars are created with a specific environment in mind, and as such, rendering an avatar is often not so computationally intensive that a computing system that can render the environment in which the avatar will interact cannot also render the complex avatar.

However, this assumption quickly loses relevance for at least two reasons. First, rendering a 3-D environment used to be limited to specialized gaming systems or computing systems with sufficient graphics hardware such as a dedicated video card with graphics processing units and dedicated memory, graphics accelerators, etc. Now, 3-D environments are often rendered on mobile devices. This is especially true in the context of virtual reality (VR) applications that are often rendered on VR headsets. Some of these VR headsets, like the OCULUS QUEST, have only as many graphics capabilities as a mobile phone. Avatars created with the expectation that they will only be rendered on a computing system with sufficient graphics hardware can require more resources to render than might be available on other platforms.

Second, complex avatars used to be application or platform-specific. An avatar might be generated for use in a particular game or with a particular gaming system. However, as the metaverse becomes a commercial reality, the ability exists to take an avatar built for one environment into other environments, and some of these environments run on hardware that is not well suited to rendering complex avatars.

The consequences of introducing a more complex avatar than the computing system can easily render can be degraded performance in rendering the environment. This consequence can be even greater in an environment where many avatars can interact together. If several avatars require too many computing resources, the environment will have unacceptable latency.

Another consequence could be that the complex avatar might not render at all. In such an instance, the computing environment might use a generic replacement avatar rather than anything that looks like the intended avatar. This is a consequence that users would not be happy to endure. A person who has created a sophisticated avatar is likely an advanced user who would not like to be viewed as a user who is so new as not to have their own unique avatar. Further, just as a person's appearance can be used to identify the person in the real world, so too, a user's avatar can be used to identify the person in a virtual world. It is not a good user experience for a game or platform to substitute a generic avatar in place of a user's unique avatar.

One concrete example of an environment in which complex avatars result in negative consequences is a gaming platform accessible on many platforms that can range from powerful, personal computers to less capable VR headsets. The gaming platform is capable of allowing users to explore and socialize in 3-D worlds. The users are all represented by avatars. When a complex avatar is present in a world that includes a user accessing the world from one of the less capable VR headsets, the user on the VR headset might experience degraded performance or might not be able to render the complex avatar at all. Even users accessing the platform using powerful personal computers could experience degraded performance if too many complex avatars are present in the same world.

The present technology alleviates the above problems by selectively representing a simplified version of the complex avatar. The simplified version of the avatar can have a similar visual appearance but can be easier to render. While the appearance will be similar, it may lack some details, or it may lack some abilities governed by custom scripts associated with the avatar. However, the present technology permits the user with the complex avatar to continue to have approximately the same visual appearance while avoiding the degraded performance addressed above.

The present technology is not limited to avatars. Similar principles to those described herein can be adapted to generate and render a simplified version of any user-generated digital object.

The present technology is particularly well suited to environments with near real-time graphics such that dynamic objects need to be rendered and re-rendered for substantially every frame.

The present method and system generates a simplified version of a complex avatar by capturing images and 3-D volume information of segments of the complex avatar while the complex avatar is rendered. When the complex avatar is requested in an environment in which it is not desirable to display the complex avatar, the captured images and 3-D volume information can be used to provide a simplified version of the avatar.

In some embodiments, the present technology can be useful when the system that would benefit from a simplified version of a complex avatar does not have any control over the model of the complex avatar. Since the system does not have control over the model of the complex avatar, the system does not have any ability to change or improve properties associated with the complex avatar. Instead, the present technology applies to any avatar or user object that can be downloaded and rendered in a suitable computing environment.

FIG. 1 illustrates an example virtual world platform 102 for playing and hosting a multiplayer virtual reality (VR) experience that is suited to carrying out the present technology. The virtual world platform 102 can connect clients 104 through web services 110 and networking services 112 to socially interact together in a virtual world hosted by virtual world platform 102.

The virtual world platform 102 primarily includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual world. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first person inputs from a user of the client device 106 upon which client 104 is executing and handles third party inputs received from another user operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual worlds or complex avatars might not be configured to perform well on certain device types, and therefore, while client 104 can operate on many platforms and devices, not all virtual worlds or complex avatars will be available or have full functionality on all client devices 106.

User interface service 108 is one service that is part of client 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client 104 is permitted to enter. Worlds API 128 can retrieve all public worlds from the world assets database 130 and send a list of those to client 104. Additionally, worlds API 128 can request world IDs for any private worlds associated with the user account logged into client 104 and retrieve the private worlds from the world assets database 130 to send to client 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual world from the menu provided by the user interface service 108, client 104 can download an instance of the virtual world by calling the worlds API 128, which can retrieve the virtual world from worlds world assets database 130 and send it to client 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client 104 can also establish a session with networking services 112 for the specific instance of the world. Networking services 112 can provide information about the current state of the instance of the virtual world. For example, networking services 112 can provide a list of remote avatars 126 present in the virtual world instance to client 104. In turn, client 104 can contact the avatars API 136 to download complex avatar assets for the list of remote complex avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics.

The downloaded instance of the virtual world can be executed by client 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client 104, and the user of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The current world 120 also has features that require networking. The current world 120 could have objects, like scissors or a light switch, that a user can pick up, and the object needs to broadcast its state across the network so that other users in the current world 120 can view the current state of the object.

Each of the local player 116, current world 120, and remote player 124 are connected to the runtime networking service 122. The local player 116 primarily transmits updated state information for the local player 116 to remote instances of client 104 that are also executing the same virtual world. The current world 120 can transmit and receive state information about the instance of the virtual world. The current world executing on client 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking plug-in such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered in a world on the virtual world platform 102.

In some embodiments virtual world platform 102 can also include a simplified avatars service 146. As will be described herein, simplified avatars service 146 can create simplified versions of complex avatars and store the avatar assets for the simplified versions of the complex avatars in avatar assets database 138.

While the virtual world platform 102 is suited to carrying out the present technology, persons of ordinary skill in the art will appreciate that the present technology can be used in other environments.

Figure 2:
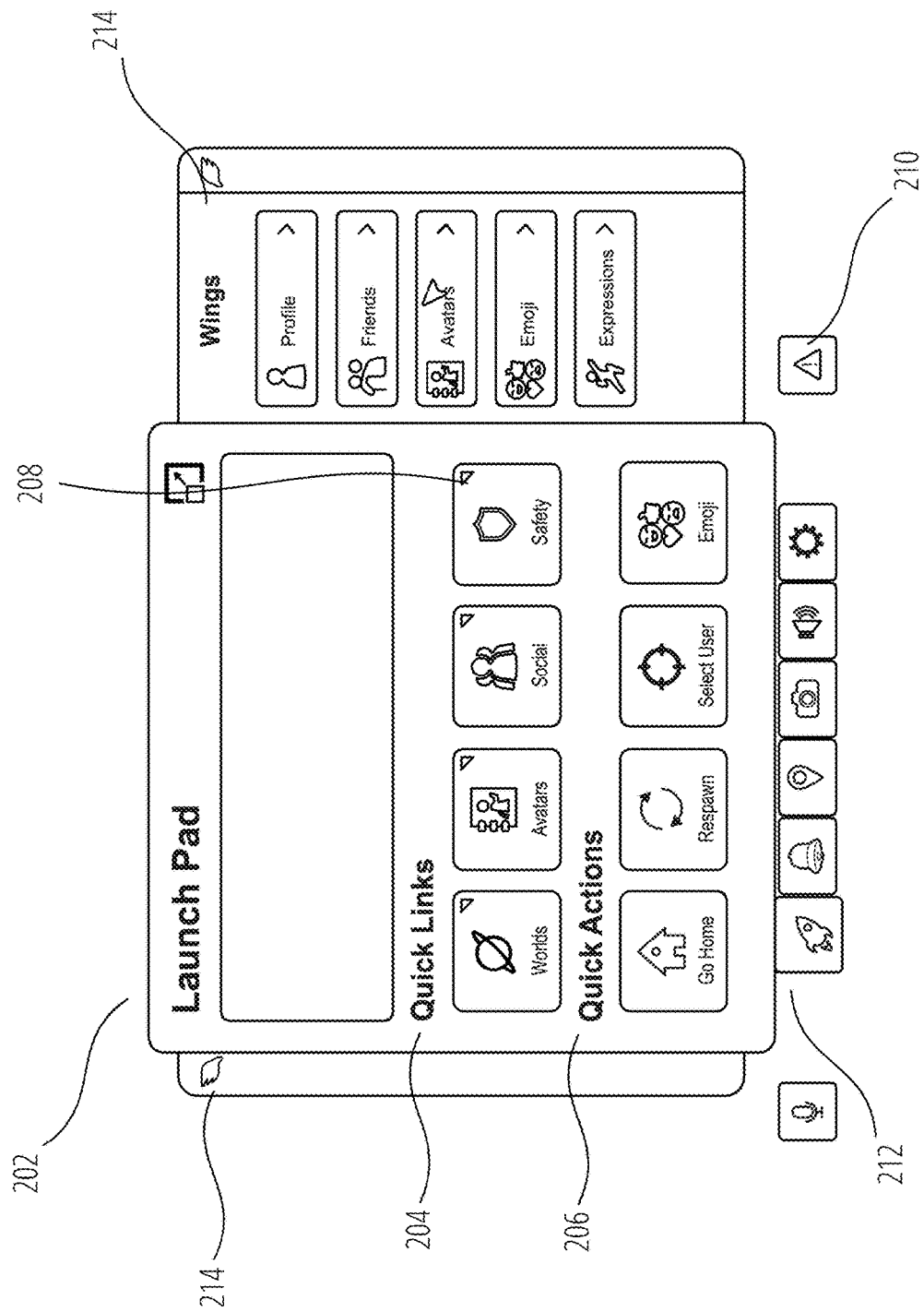
FIG. 2 illustrates an example quick menu in accordance with some aspects of the present technology.

FIG. 2 illustrates an example quick menu 202 in accordance with some aspects of the present technology. In particular, the quick menu 202 can be surfaced by the user interface service 108 on client 104 at any time or place in the virtual world platform 102.

The quick menu 202 includes a quick links 204 section that includes many commonly used menu options such as menus to browse worlds, avatars, friends, and a safety menu 208 to set safety settings for the user's profile.

The trust and safety menu 208 provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic or safe mode 210 to audio-and-visually mute anybody who is not a friend.

The quick menu 202 can also include a quick actions 206 section to provide frequently used actions in a convenient location. Some example quick actions include an action to go to your homeworld, to respawn in the last world you were in, to select another user's avatar (to communicate privately, to block the user from viewing or speaking to the local player 116, to copy the avatar or other function), and to select emojis.

The quick menu 202 also includes a dock 212, which also provides access to some common features like a virtual camera, volume settings, and a settings menu, among other features.

Figure 3:
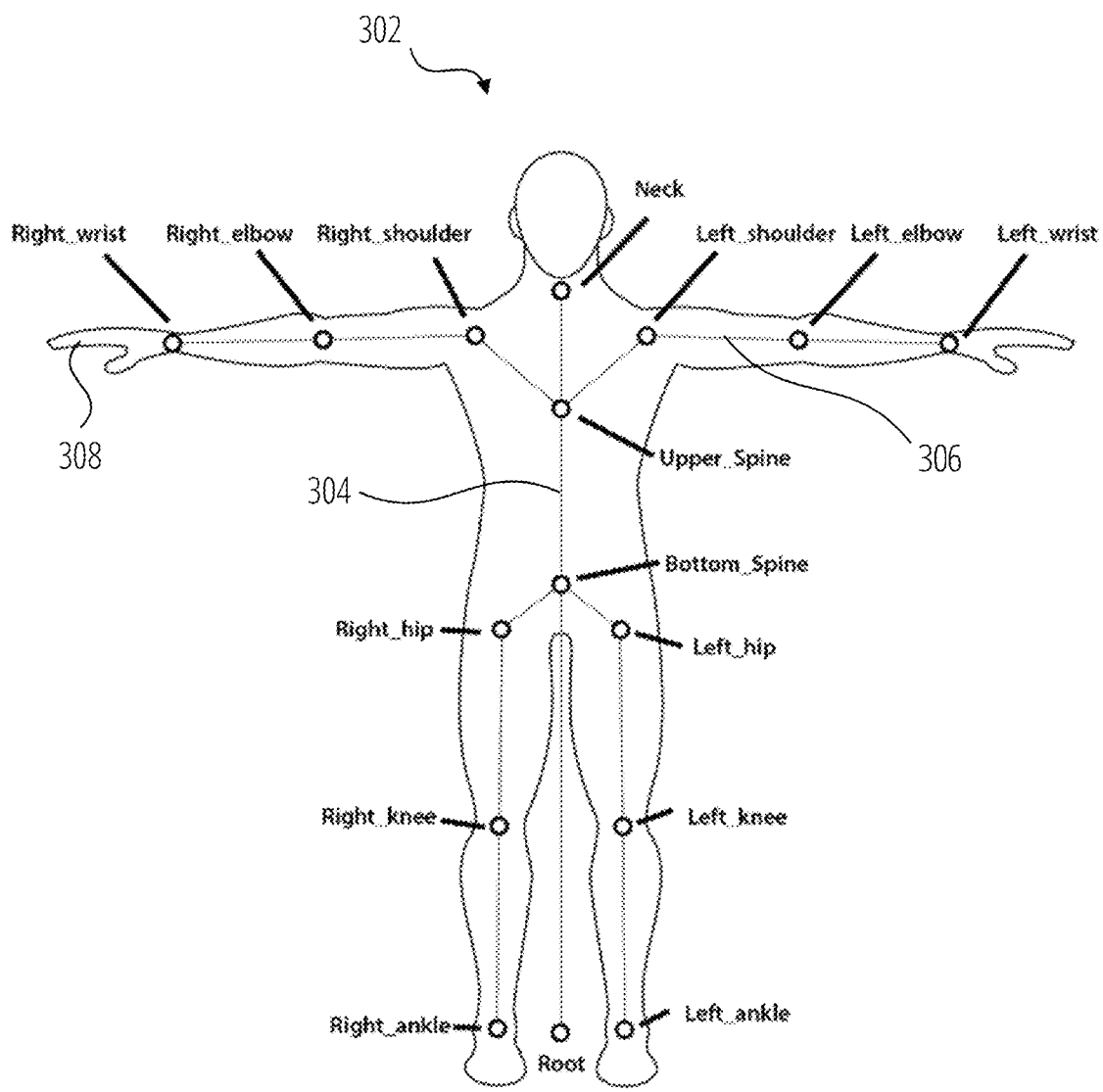
FIG. 3 illustrates an example avatar illustrated along with its skeleton in accordance with some aspects of the present technology.

FIG. 3 illustrates an example avatar 302 illustrated along with its skeleton 304. The skeleton 304 is comprised of a plurality of joints. Between each joint or between a joint and the terminal portions of the avatar are segments of the avatar. For example, the upper left arm between the shoulder and elbow is a segment 306, and the right hand between the wrist and the terminal portion (fingertips) is a segment 308. Just as with a human skeleton, the joints are areas of articulation which are used to move the body segments.

In addition to the skeleton 304, the avatar is made up of a 3-dimensional (3D) model that includes a mesh that gives the avatar a 3D shape and various artistic properties, including textures, shading, etc.

As illustrated in FIG. 3, the avatar 302 has a humanoid form arranged in a t-shaped pose. The t-shaped pose provides a large number of unobstructed views of segments of the avatar from many angles.

As introduced above, the present technology pertains to creating and rendering a simplified version of a complex avatar. In some embodiments, the complex avatar is made up of a high number of polygons, complicated mesh patterns, custom animations, metadata, scripts, shader properties, etc. All of these attributes make complex avatars difficult and slow to render. However, regardless of the specific properties of a complex avatar, as used herein, a "complex avatar" refers to an avatar that is/has been determined to be difficult to render in a particular environment in which the complex avatar has been requested.

Figure 4A:
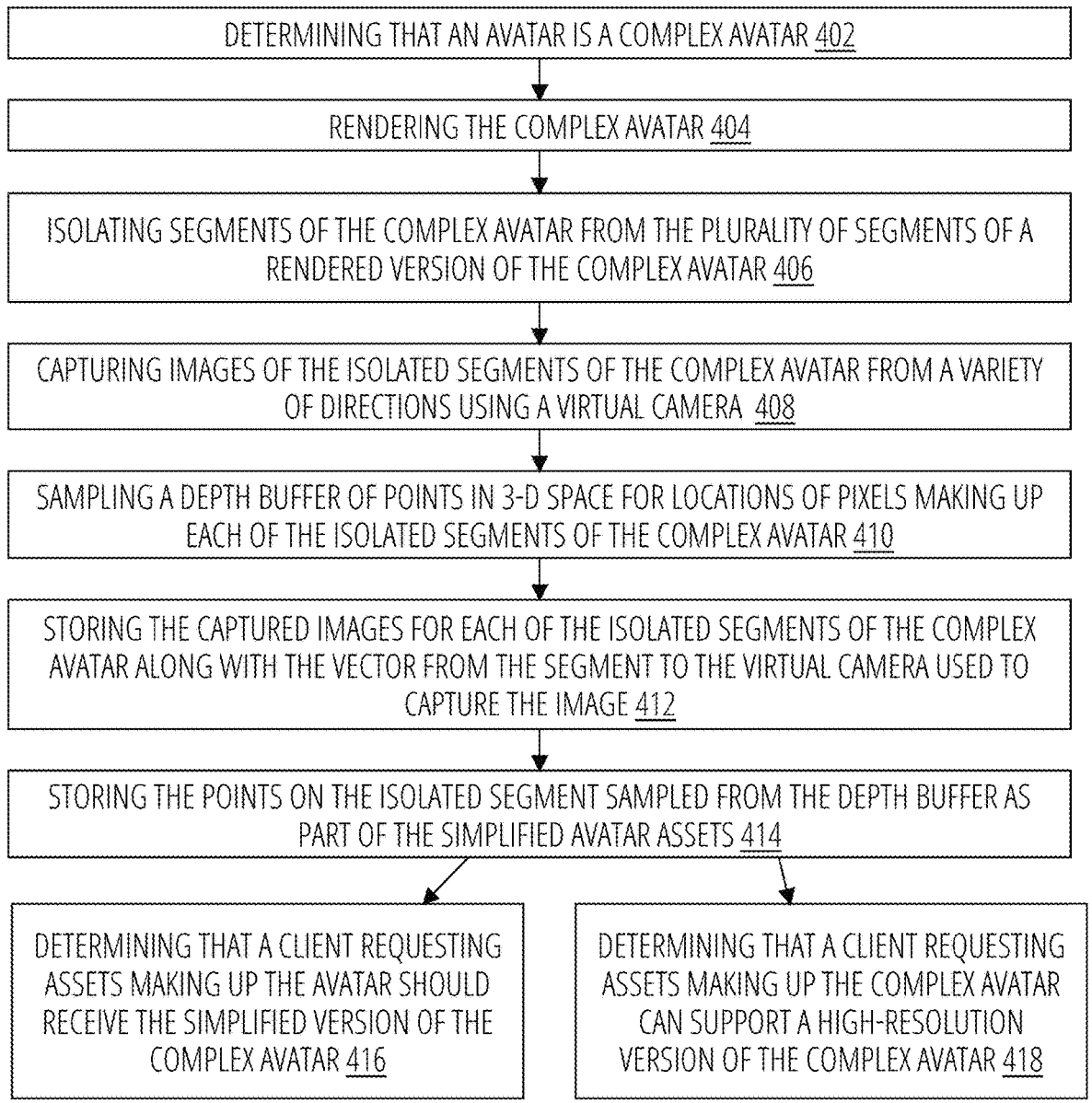
FIG. 4A illustrates an example method for creating a simplified version of a complex avatar in accordance with some aspects of the present technology.

FIG. 4A illustrates an example method for creating a simplified version of a complex avatar. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some embodiments, the method includes determining that an avatar is a complex avatar at block 402. For example, the simplified avatars service 146 illustrated in FIG. 1 can analyze an avatar stored in avatar assets database 138 to determine that it is a complex avatar. A "complex avatar" refers to an avatar that may be difficult to render in a particular environment. In some embodiments, the simplified avatars service 146 can determine that avatar is a complex avatar when the avatar assets are uploaded for storage at the avatar assets database 138. In some embodiments, the simplified avatars service 146 can determine that the avatar is a complex avatar after the avatar assets are downloaded by a client 104 and performs poorly when trying to render the complex avatar.

According to some embodiments, the method includes rendering the complex avatar at block 404. For example, the simplified avatars service 146 can render the complex avatar. In some embodiments, the simplified avatars service 146 can render the complex avatar in a process in a cloud datacenter such as the datacenter used by web services 110. In some embodiments, the rendered version of the complex avatar is rendered in a t-pose. In some embodiments, the complex avatar is a humanoid complex avatar defined by a humanoid tree of joints.

According to some embodiments, the method for creating a simplified version of a complex avatar includes isolating segments of a complex avatar from the plurality of segments of a rendered version of the complex avatar at block 406. For example, the simplified avatars service 146 may isolate segments of the complex avatar from the plurality of segments of a rendered version of the complex avatar. The isolated segments of a humanoid avatar can include feet, hands, forearms, upper arms, heads, upper torso, lower torso, upper leg, lower leg, etc. Other segments are also possible, especially in avatars having additional joints or that are non-humanoid.

Figure 5A:
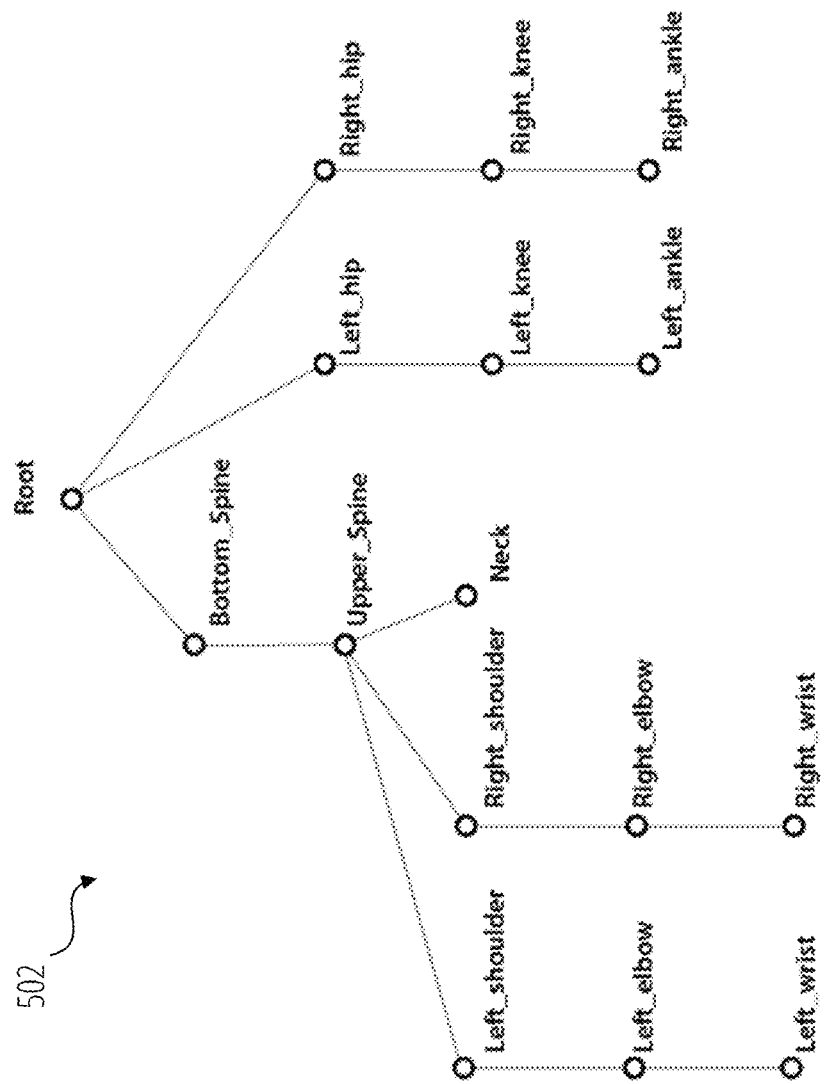
FIG. 5A and FIG. 5B illustrate reparenting of a tree of joints in accordance with some aspects of the present technology.

In order to isolate the segments of the complex avatar, the simplified avatars service 146 can select a segment of the complex avatar to be isolated from the plurality of segments represented by a tree of joints. (An example tree of joints for a humanoid skeleton, such as shown in FIG. 3 is illustrated in FIG. 5A.) A segment can be selected by identifying locations of joints at terminal ends of the segment to be isolated onto portions of the rendered version of the complex avatar. The simplified avatars service 146 can be configured to methodically progress through the tree of joints one at a time for a humanoid avatar.

Before the selected segment of the complex avatar can be isolated, simplified avatars service 146 first reparents the tree of joints to make one of the joints at the terminal ends of the segment a new root node of the tree of joints. Typically, the joint that will become the new root node is at one of the terminal ends of the segment that already occupies the higher level in the tree of joints.

The reparenting the tree of joints comprises iteratively reorganizing the tree of joints to promote the desired node in the tree of joints one level until the desired node is at the top of the tree of joints. The relative organization of the tree of joints remains the same, whereby each node in the tree of joints remains connected to a same neighbor in the tree of joints as the tree of joints is iteratively reorganized. It is only the level in the tree of joints that changes for the respective joints. If this process were animated, it might appear as if the terminal ends of the selected segment remain in place while the rest of the tree of joints rotates about the selected segment until one of the terminal ends of the selected segment is at the top of the tree of joints.

Figure 5B:
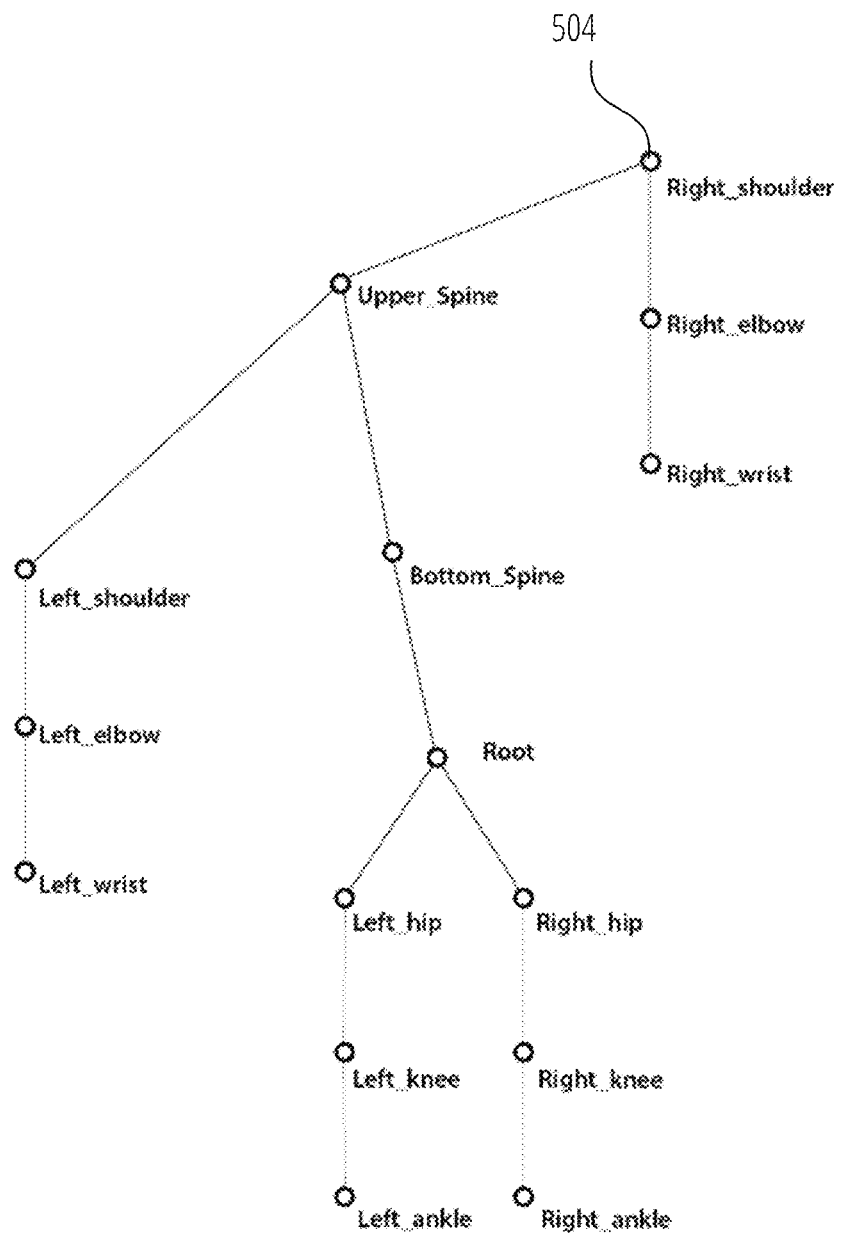
Figure 6C:
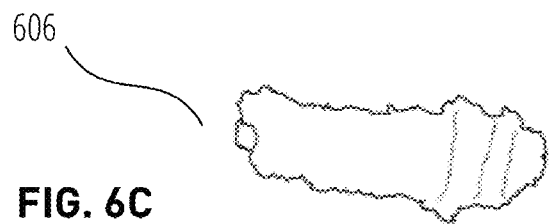
FIG. 6C illustrates the isolated segment as a captured image in accordance with some aspects of the present technology.
Figure 6B:
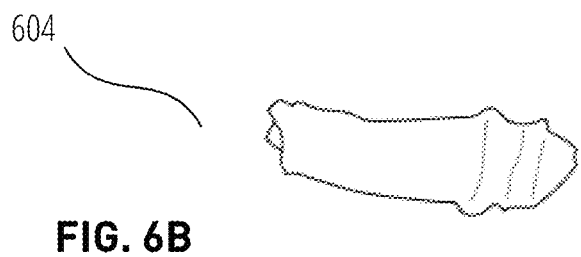
FIG. 6B illustrates an isolated segment in accordance with some aspects of the present technology.
Figure 6A:
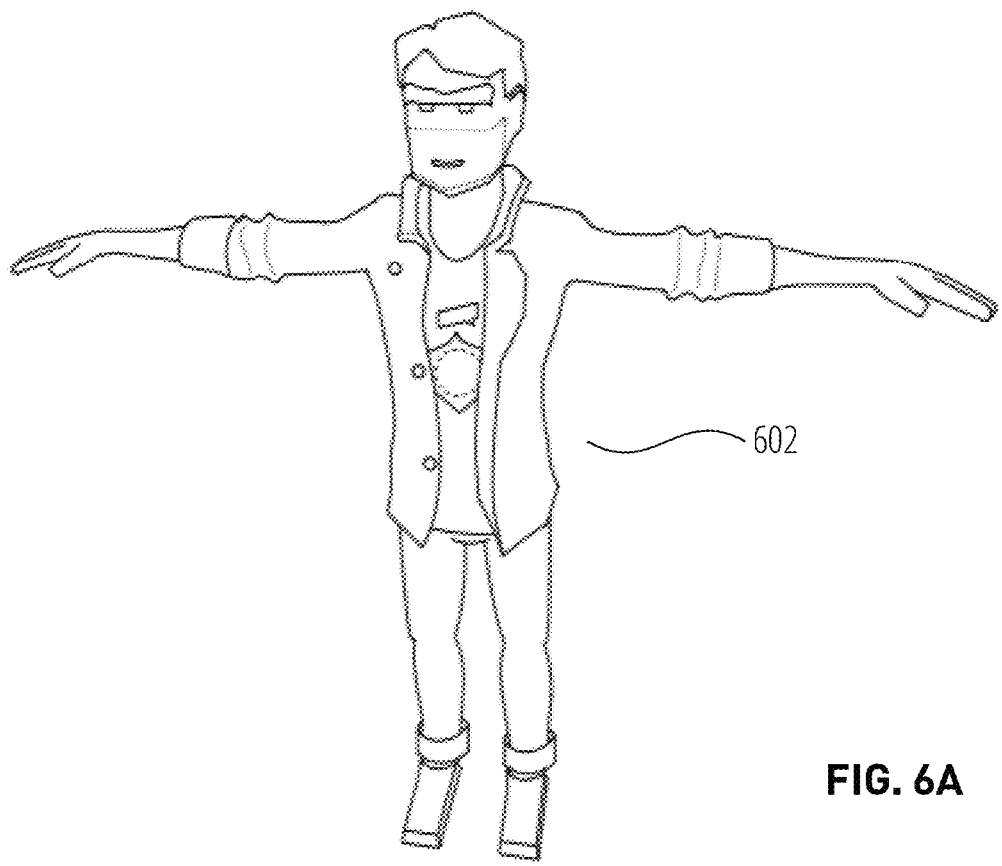
FIG. 6A illustrates the rendered version of the complex avatar in accordance with some aspects of the present technology.

FIG. 5A, FIG. 5B illustrate the reparenting of the tree of joints 502 and FIG. 6A, FIG. 6B, and FIG. 6C, illustrate the isolation of the selected isolated segment. As addressed below, FIG. 5A and FIG. 5B illustrates reparenting the tree of joints so that the right shoulder has become the root node of the tree of joints, thereby allowing the right upper arm (between the right shoulder and the right elbow) to be the isolated segment.

Once the tree of joints has been reparented to bring the segment to be isolated to the root of the tree of joints, the isolating of the segments of the complex avatar can be completed by scaling the terminal ends of the selected segment to less than 1% scale. In some embodiments, the less than 1% scale is 1/10,000th to 1/100,000th scale. In some embodiments, the less than 1% is greater than zero to avoid potential errors from the rendering engine.

The scaling of the terminal ends (joints at either end) of the isolated segment results in a collapsing of portions of the rendered version of the complex avatar other than the isolated segment into the respective joints at the terminal ends of the isolated segment. This scaling results in a rendering where only the isolated segment of the complex avatar is visible. The rest of the complex avatar is still present, but since everything from the terminal end of the selected segment to be isolated to the bottom of the tree has been scaled to a very small scale, it is no longer visible. This is illustrated in FIG. 6B.

Scaling the terminal ends of the selected segment to be isolated has the advantage of rendering the isolated segment of the complex avatar as a closed volume. It may be possible to isolate the segment by other methods. For example, it might be possible to mask the rest of the complex avatar, crop the selected segment of the avatar, or cause the rest of the avatar not to be rendered. However, these techniques would likely cause the isolated segment to appear hollow when viewed from certain angles, and this would have the undesirable consequence of making the simplified version of the complex avatar look like a collection of disconnected parts when viewed from certain angles. However, it should be understood that the present technology does encompass these other techniques as the open volume consequence of these methods can be addressed by other known techniques in the art.

According to some embodiments, the method includes capturing images of the isolated segments of the complex avatar from a variety of directions using a virtual camera at block 408. For example, the simplified avatars service 146 may capture images of the isolated segments of the complex avatar from a variety of directions using a virtual camera. For each direction from which the images of the isolated segment were captured, a visual appearance and a shape of the segment of the rendered complex avatar is captured. In some embodiments, the images of the segments are associated with a vector from the isolated segments to the virtual camera used to capture the image.

In some embodiments, images are typically captured from between 50-100 orientations, but the images can be captured from any number of orientations. In some embodiments, the different orientations are obtained by moving the isolated segment of the complex avatar into different orientations about the virtual camera. Alternatively, the virtual camera can move about the isolated segment of the complex avatar. Alternatively still, another method of obtaining the captured images from different orientations includes establishing a plurality of the virtual cameras at different positions about the isolated segment of the complex avatar to capture different orientations of the isolated segment.

The captured images are simple sprites and do not include a high number of polygons, complicated mesh patterns, custom animations, metadata, scripts, or shader properties. In some embodiments, even though the captured images were taken of a 3-D object they do not provide depth information.

According to some embodiments, the method includes sampling a depth buffer of points in 3-D space for locations of pixels making up each of the isolated segments of the complex avatar at block 410. For example, the simplified avatars service 146 may sample a depth buffer of points in 3-D space for locations of pixels making up each of the isolated segments of the complex avatar. The information captured from the depth buffer provides information about the 3-D shape of the complex avatar.

In some embodiments, the sampling of the depth buffer is from the same point of view as the virtual camera when capturing the images of the isolated segment of the complex avatar. In such embodiments, the samples from the depth buffer can be associated with the captured images taken from the virtual camera from the same direction, or both sets of information can be associated with the same vector.

In some embodiments, the samples from the depth buffer and the images of the isolated segments can be used to reproduce the isolated segment in a simplified version. In one method, an isolated segment and depth buffer matching a point of view can be selected and the captured image of the isolated segment can be mapped onto a volume formed using the samples from the depth buffer and this will result in providing a reasonable approximation of the appearance of the isolated segment from that point of view. In this method only the visible portion of the isolated segment is generated. In another method, the collection of samples from the depth buffer can be used to generate a complete 3-D depth map of the isolated segment, and the captured image from a particular point of view can be mapped onto the complete 3-D depth map. In this method, a full 3-D volume of the isolated segment is created as an invisible mesh and the image of the isolated segment is placed on top of the full 3-D volume such that while the isolated segment occupies a 3-D volume, only a portion of it is visible at any time. In both methods, the only portion that would be visible corresponds to the point of view so that the invisible portions of the isolated segment are not noticeable from that point of view.

According to some embodiments, the method includes storing the captured images for each of the isolated segments of the complex avatar along with the vector from the segment to the virtual camera used to capture the image at block 412. For example, the simplified avatars service 146 may store the captured images and the depth information for each of the isolated segments of the complex avatar along with the vector from the segment to the virtual camera used to capture the image. Collectively the captured images for each of the isolated segments and the depth information and the vectors toward the virtual camera for each of the captured images makes up the avatar assets for the simplified version of the complex avatar.

Once a simplified version of a complex avatar exists, it does not mean that the simplified version will always be served to requesting clients. When the requesting client is able to render the complex avatar, this set of avatar assets will be served. Accordingly, the avatars API 136 must determine which avatar version to serve to requesting clients. In some instances, one client will render the complex avatar in its instance of a virtual world while another client will render the simplified version of the avatar for its instance of the virtual world.

In some embodiments, a requesting client might explicitly request a simplified version of the avatar, and in that instance, the avatars API 136 can serve the simplified version of the avatar.

According to some embodiments, the method includes determining that a client requesting assets making up the avatar should receive the simplified version of the complex avatar at block 416. For example, the avatars API 136 may determine that a client requesting assets making up the avatar should receive the simplified version of the complex avatar. In some embodiments, the client will use the collection of images of the segments of the complex avatar and a collection of depth buffer points for the segments of the complex avatar to render the simplified version of the avatar.

According to some embodiments, the method includes determining that a client requesting assets making up the complex avatar can support a high-resolution version of the complex avatar at block 418. For example, the avatars API 136 may determine that a client requesting assets making up the complex avatar can support a high-resolution version of the complex avatar. In some embodiments, the client can render some of the complex avatars in the virtual world using the simplified version of the complex avatar.

In some embodiments, generating the avatar assets for the simplified version of the complex avatar is performed in an offline or in a non-time sensitive process. In other words, the generating of the avatar is not performed at the time a simplified version of the avatar is requested. Rather the generating of the simplified version of the complex avatar can be performed when the avatar is first stored in avatar assets databases 138. Alternatively, a workflow to create the simplified version of the avatar can be queued once a client reports unsuitable performance in attempting to render the complex avatar. In some embodiments, a user can select their own avatar, or an avatar in a virtual world, and can request to have a simplified version of the avatar created.

FIG. 4B illustrates an example method for creating a simplified version of a complex avatar in alternate poses. As described with respect to FIG. 4A, the complex avatar is rendered in a t-pose and then segments are isolated and images are captured. However, the result of capturing the images in just one pose is that some common poses for the avatar might not be able to be rendered. For example, the hands of the avatar might be able to open or close or point, and the mouth of an avatar likely animates open and closed or from similes to frowns and during speech. These poses are not the result of articulations in the joints from the tree of joints so they would not be supported by the many different camera angles addressed above. Accordingly, to support these common poses that would not be supported by the steps disclosed with respect to FIG. 4A, it may be required to pose the avatar, or at least portions of the avatar in additional poses.

According to some embodiments, the method includes rendering the complex avatar in a second pose at block 420. For example, the simplified avatars service 146 may render the complex avatar in a second pose.

According to some embodiments, the method includes capturing images of the isolated segments of the complex avatar in the second pose at block 422. For example, the simplified avatars service 146 may capture the images of the isolated segments of the complex avatar in the second pose. For example, the second pose might include open hands, closed hands, and different mouth states, etc. While the present description refers a second pose, it will be appreciated by those of ordinary skill in the art that this is merely to distinguish the second pose from the first pose, and that the complex avatar, or portions thereof, can be rendered in any number of poses and the method can include capturing images of the complex avatar in any number of poses.

FIG. 5A and FIG. 5B illustrate the reparenting of the tree of joints 502. In FIG. 5A, the tree of joints 502 illustrates the root of the tree of joints as being between the lower back and the hips.

Each of those branches has branches coming off them that represent the attached limbs such as shoulders branching off the chest and lower legs branching off the upper legs. Branches that are near the root of the hierarchy are above or higher in the tree of joints than those that are further from the root.

As addressed above, the present technology isolates each limb segment of the avatar (e.g., the upper arm from shoulder to elbow) using functionality provided by gaming engines, such as the gaming engine from UNITY SOFTWARE INC., which help determine which locations represent the main joints of a humanoid.

Also as addressed above with respect to block 406, part of isolating a segment of the humanoid, involves reparenting the tree of joints. The present technology can reparent the tree of joints 502 for every segment to be isolated.

FIG. 5B illustrates an example of the reparenting of the tree of joints to move the joint for the right shoulder 504 to be the parent node, or highest node, or top node of the tree such that every other joint is subordinate to the right shoulder 504 in the tree of joints 502. It is an iterative process to arrive at the tree of joints 502 having the right shoulder 504 being the parent node. The present technology eventually results in a new hierarchy of every joint above the isolated segment. For example in FIG. 5B the right shoulder 504 is now the root of the hierarchy, and the joint that used to be above the isolated segment (such as the neck or chest) is moved to the previous position of the right shoulder 504.

FIG. 6A, FIG. 6B, and FIG. 6C illustrate the general steps addressed above regarding rendering the complex avatar in block 404, isolating segments of the complex avatar in block 406, and capturing images of the complex avatar in block 408.

FIG. 6A illustrates the rendered version of the complex avatar 602. Although it is difficult to illustrate in line drawing form, the rendered version of the complex avatar 602 can be highly detailed and can have a complex 3-D shape or require a lot of triangles to be drawn to render properly. The complexity or detail can cause the avatar to be difficult to render in some environments.

FIG. 6B illustrates an isolated segment. In this example the isolated segment is the right upper arm. FIG. 6B illustrates the same version of the upper right arm as rendered in FIG. 6A, except that the rest of the complex avatar is not visible. In some embodiments, the rest of the complex avatar has been scaled to such a small size that it is not visible.

FIG. 6C illustrates the isolated segment as a captured image 606. Although difficult to illustrate in line drawing form, the captured image is of a smaller file size and easier to render. In some embodiments, the captured image may be of somewhat lower quality or resolution that the complex version of the isolated segment, and might not include any associated scripts or animations. The isolated segment as the captured image along with the depth buffer data can be used to build a copy of the isolated segment as viewed from the direction of the camera used to capture it.

In the present technology, instead of drawing the original character model, the present technology selects the best fitting pre-generated image and shape for each limb segment, which is the one that was captured using a camera that was facing the same way as the current view camera, or the closest one to that direction, and draw it instead. This reduces the size of the character assets such that more of them can be loaded into memory on a given device and it reduces the geometric complexity of the character such that it takes less resources to render it to the screen. The size of the output using the current technology does not grow with the size of the data of the input complex avatar. A normally proportioned humanoid simplified version of an avatar can export to a file that is about 3-4 MB even if the original complex avatar was 100 MB or more.

Figure 7:
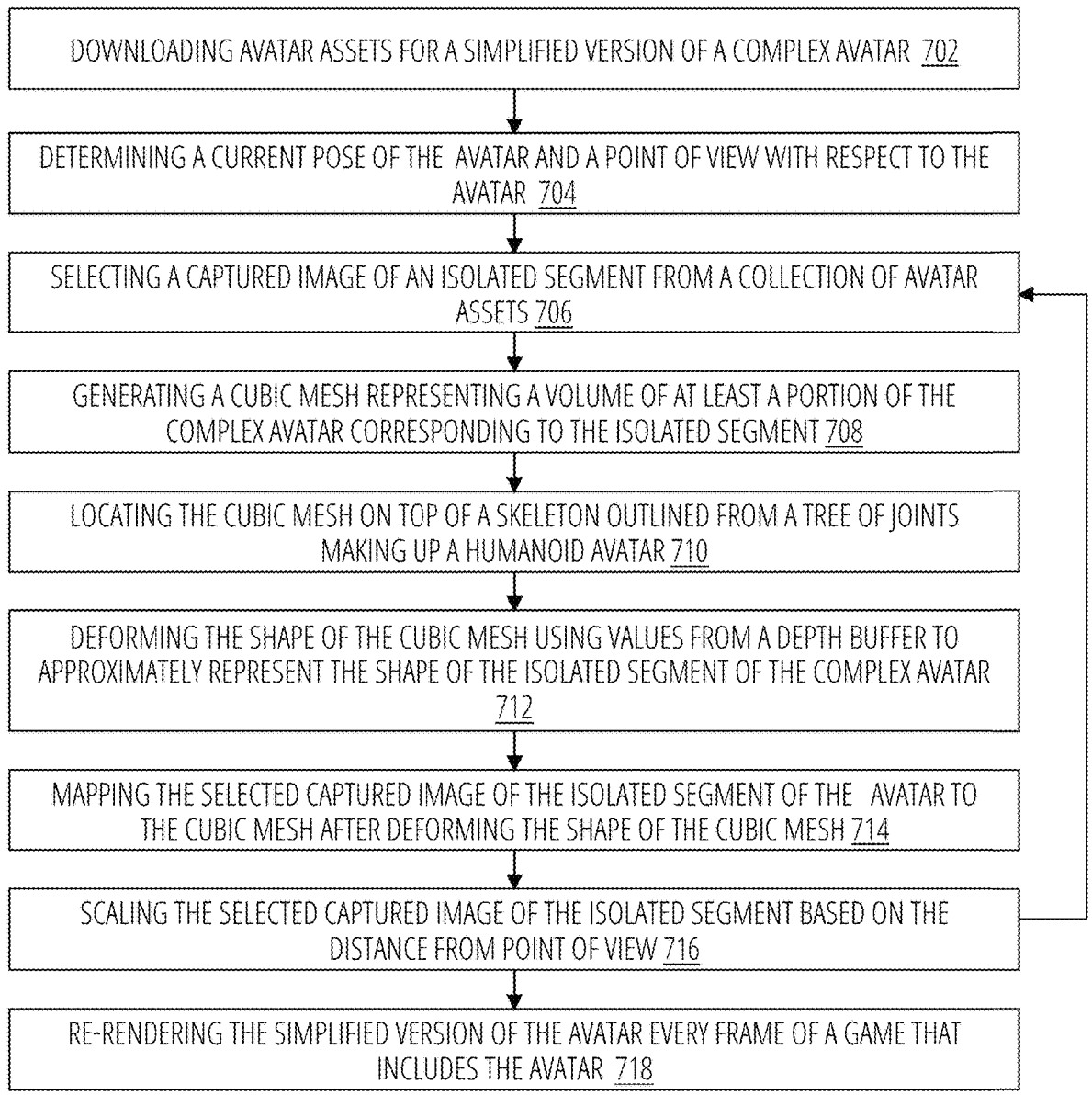
FIG. 7 illustrates an example method for rendering a simplified version of the complex avatar from the captured images and depth buffer data in accordance with some aspects of the present technology.

FIG. 7 illustrates an example method for rendering a simplified version of the complex avatar from the captured images and depth buffer data. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some embodiments, the method includes downloading avatar assets for a simplified version of a complex avatar at block 702. For example, client 104 can request avatar assets for an avatar from avatars API 136. Avatars API 136 can determine that client 104 should be served a simplified version of the avatar assets, and client 104 can download the avatar assets for a simplified version of a complex avatar. The avatar assets can be for the local avatar 118 or remote avatar 126. Generally, the avatar assets will be for the remote avatar 126 when the local player 116 is controlling their avatar from a first person point of view. But in instances where the local player 116 is controlling their avatar from a perspective view the avatar assets can pertain to the local avatar 118

According to some embodiments, the method includes determining a current pose of the avatar and a point of view from which to render the avatar with respect to the avatar at block 704. For example, the client 104 may determine a current pose of the avatar and a point of view with respect to the avatar. Generally, the point of view is from the perspective of the local player 116 viewing a remote avatar 126. But in some embodiments, the point of view could be from a perspective view camera and the avatar could be the local avatar 118 or the remote avatar 126.

According to some embodiments, the method includes selecting a captured image of an isolated segment from a collection of avatar assets at block 706. For example, the client 104 may select a captured image of an isolated segment from a collection of avatar assets. In some embodiments, the selected captured image is associated with the vector from the isolated segment to a virtual camera used to capture the captured image that most closely matches a vector from the isolated segment to the point of view.

According to some embodiments, the method includes generating a square mesh representing an area of at least a portion of the complex avatar corresponding to the isolated segment at block 708. For example, the client 104 may generate a square mesh representing an area of at least a portion of the complex avatar corresponding to the isolated segment. While the term square mesh is used, any shape of mesh can be used.

According to some embodiments, the method includes locating the square mesh on top of a skeleton outlined from a tree of joints making up a humanoid avatar at block 710. For example, the client 104 can determine where joints of a skeleton in a tree of joints should be located in the virtual world and can locate the square mesh on top of a segment of the skeleton corresponding to the isolated segment selected as addressed with respect to block 706.

The purpose of the square mesh is to define the 3-D shape of the avatar or segment of the avatar. However, the square mesh is simply a 2-D area and therefore needs further processing to yield a shape that is similar to the shape of the isolated segment of the complex avatar. According to some embodiments, the method includes deforming the shape of the square mesh using values from a depth buffer to approximately represent the shape of the isolated segment of the complex avatar at block 712. For example, the client 104 may deform the shape of the square mesh using values from a depth buffer to approximately represent the shape of the isolated segment of the complex avatar. In particular, the values from the depth buffer can correspond to x, y vertices of the square mesh that need to be adjusted in the z-plane to deform the 2-D mesh into a 3-D shape.

According to some embodiments, the method includes mapping the selected captured image of the isolated segment of the avatar to the square mesh after deforming the shape of the square mesh at block 714. For example, the client 104 may map the selected captured image of the isolated segment of the avatar to the square mesh.

According to some embodiments, the method includes scaling the selected captured image of the isolated segment based on the distance from point of view at block 716. For example, the client 104 may scale the selected captured image of the isolated segment based on the distance from point of view.

As will be appreciated by those of ordinary skill in the art the functions described with respect to block 706 through block 716 need to be repeated for each isolated segment making up the simplified version of the complex avatar. The functions described with respect to block 706 through block 716 can be performed in parallel for each segment or can be performed in series.

According to some embodiments, the method includes re-rendering the simplified version of the avatar every frame of a game that includes the avatar at block 718. For example, the client 104 may re-render the simplified version of the avatar every frame of a game that includes the avatar.

Figure 8:
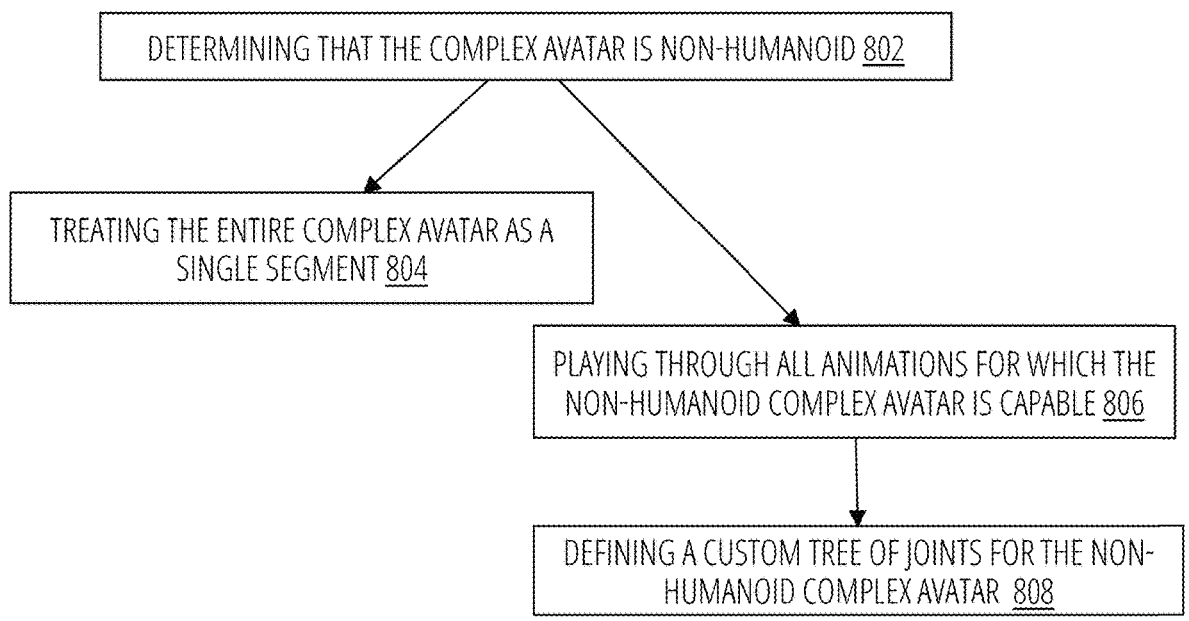
FIG. 8 illustrates an example method for supporting non-humanoid complex avatars in accordance with some aspects of the present technology.

FIG. 8 illustrates an example method for supporting non-humanoid complex avatars. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some embodiments, the method includes determining that the complex avatar is non-humanoid at block 802. For example, the simplified avatars service 146 illustrated may determine that the complex avatar is non-humanoid if it cannot map the avatar to a humanoid tree of joints.

According to some embodiments, one method of handling a non-humanoid avatar is to treat the entire complex avatar as a single segment at block 804. For example, the simplified avatars service 146 may treat the entire complex avatar as a single segment. Accordingly, the entire avatar could be imaged in a single pose or multiple poses as addressed with respect to the humanoid avatar in FIG. 4A. Rather than isolating multiple segments, the whole avatar can be treated as a single avatar and images and depth buffer data can be captured from multiple angles.

According to some embodiments, another method of handling non-humanoid complex avatars is to play through all animations for which the non-humanoid complex avatar is capable at block 806. For example, the simplified avatars service 146 may play through all animations for which the non-humanoid complex avatar is capable.

According to some embodiments, the method includes defining a custom tree of joints for the non-humanoid complex avatar at block 340. For example, the simplified avatars service 146 may define a custom tree of joints for the non-humanoid complex avatar. By observing all movements associated with the non-humanoid complex avatar, the simplified avatars service 146 can identify all points of articulation and create a tree of joints for the non-humanoid complex avatar.

Once a tree of joints has been defined, the simplified avatars service 146 can create avatar assets for the non-humanoid complex avatar in the same way as it would for a humanoid avatar described herein.

Accordingly, one advantageous aspect of the present technology is that it is capable of creating a simplified version of any complex avatar or any user generated object. Thus, users can continue to generate highly complex works that will render as intended in environments that are capable, and will be able to render in a simplified form in environments that are less capable.

Figure 9:
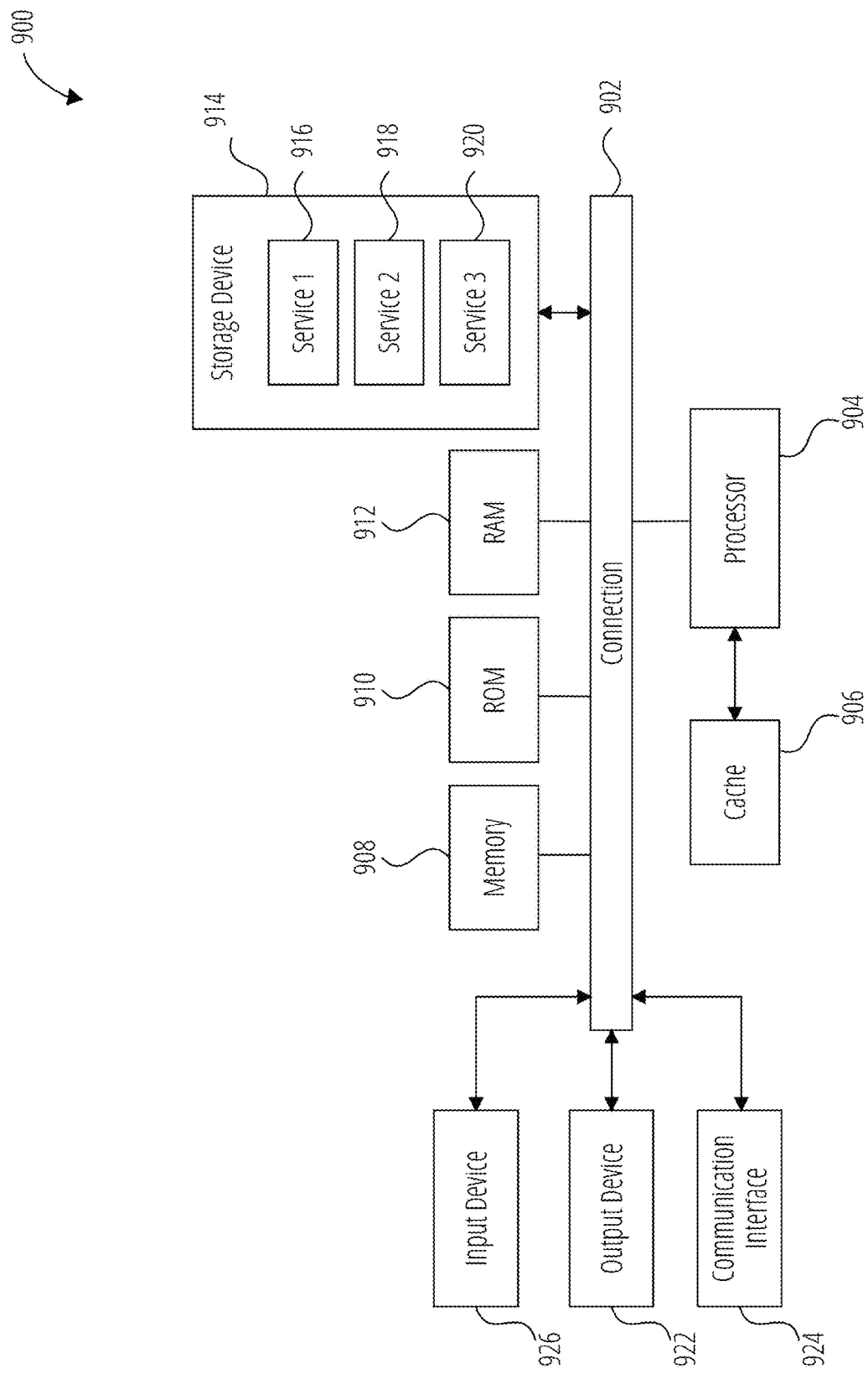
FIG. 9 shows an example of a system for implementing certain aspects of the present technology.

FIG. 9 shows an example of computing system 900, which can be for example any computing device making up client device 106, or web services 110, or any component thereof in which the components of the system are in communication with each other using connection 902. Connection 902 can be a physical connection via a bus, or a direct connection into processor 904, such as in a chipset architecture. Connection 902 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 904 and connection 902 that couples various system components including system memory 908, such as read-only memory (ROM) 910 and random access memory (RAM) 912 to processor 904. Computing system 900 can include a cache of high-speed memory 906 connected directly with, in close proximity to, or integrated as part of processor 904.

Processor 904 can include any general purpose processor and a hardware service or software service, such as services 916, 918, and 920 stored in storage device 914, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 914 can include software services, servers, services, etc., that when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method for generating a simplified version of a complex avatar made up of a plurality of segments, the method comprising: isolating segments of the complex avatar from the plurality of segments of a rendered version of the complex avatar; for each of the isolated segments, capturing images of the isolated segments of the complex avatar from a variety of directions using a virtual camera, wherein the images of the segments are associated with a vector from the isolated segments to the virtual camera used to capture the image; and storing the captured images for each of the isolated segments of the complex avatar along with the vector from the segment to the virtual camera used to capture the image, collectively the captured images make up simplified avatar assets used to render a simplified version of the complex avatar.

Aspect 2. The method of Aspect 1, further comprising: sampling a depth buffer of points in 3-D space for locations of pixels making up each of the isolated segments of the complex avatar.

Aspect 3. The method of any of Aspects 1 to 2, further comprising: storing the points on the isolated segment sampled from the depth buffer as part of the simplified avatar assets.

Aspect 4. The method of any of Aspects 1 to 3, wherein the sampling the depth buffer of points for each of the isolated segments further comprises: sampling the depth buffer from a point of view of the virtual camera when capturing the images of the isolated segment of the complex avatar.

Aspect 5. The method of any of Aspects 1 to 4, whereby for each direction from which the images of the isolated segment were captured, a visual appearance and a shape of the segment of the rendered complex avatar is captured.

Aspect 6. The method of any of Aspects 1 to 5, wherein the capturing the images of the isolated segment of the complex avatar from a variety of directions further comprises: moving the isolated segment of the complex avatar into different orientations about the virtual camera.

Aspect 7. The method of any of Aspects 1 to 6, wherein images are captured from between 50-100 orientations, but can be any number of orientations.

Aspect 8. The method of any of Aspects 1 to 7, wherein the capturing the images of the isolated segment of the complex avatar from a variety of angles further comprises: moving the virtual camera about the isolated segment of the complex avatar to capture different orientations of the isolated segment.

Aspect 9. The method of any of Aspects 1 to 8, wherein the capturing the images of the isolated segment of the complex avatar from a variety of angles further comprises: establishing a plurality of the virtual cameras at different positions about the isolated segment of the complex avatar to capture different orientations of the isolated segment.

Aspect 10. The method of any of Aspects 1 to 9, wherein the rendered version of the complex avatar is rendered in a t-pose.

Aspect 11. The method of any of Aspects 1 to 10, wherein the complex avatar is a humanoid complex avatar defined by a tree of joints, wherein a segment of the complex avatar is a portion of the complex avatar between two joints in the tree of joints.

Aspect 12. The method of any of Aspects 1 to 11, wherein the isolating the segment of the complex avatar from the plurality of segments of a rendered version of the complex avatar further comprises: selecting the segment of the complex avatar to be isolated from the plurality of segments represented by the tree of joints; identify locations of joints at terminal ends of the segment to be isolated onto portions of the rendered version of the complex avatar; reparenting the tree of joints to make one of the joints at the terminal ends of the segment a new root node of the tree of joints; scaling the portions of the rendered complex avatar where the joints at terminal ends of the segment to be isolated are located to less than 1% scale, thereby collapsing portions of the rendered version of the complex avatar other than the isolated segment into the respective joints at the terminal ends of the isolated segment resulting in a rendering of the isolated segment of the complex avatar.

Aspect 13. The method of any of Aspects 1 to 12, wherein the less than 1% scale is $\frac{1}{10,000}$th to $\frac{1}{100,000}$th scale.

Aspect 14. The method of any of Aspects 1 to 13, whereby the result of the scaling is that the isolated segment of the complex avatar has a closed volume.

Aspect 15. The method of any of Aspects 1 to 14, wherein the reparenting the tree of joints further comprises: whereby each node in the tree of joints remains connected a same neighbor in the tree of joints as the tree of joints is iteratively reorganized.

Aspect 16. The method of any of Aspects 1 to 15, further comprising: rendering the complex avatar in another pose; and recapturing the images of the isolated segments of the complex avatar in the another pose, for example the another pose can be open hands, closed hands, mouth, etc.

Aspect 17. The method of any of Aspects 1 to 16, the method further comprising: storing the avatar assets making up the complex avatar; and storing avatar assets making up the simplified version of the complex avatar as a collection of images of the isolated segments of the complex avatar and a collection of depth buffer points for the isolated segments of the complex avatar in an avatar assets database.

Aspect 18. The method of any of Aspects 1 to 17, further comprising: determining that a client requesting assets making up the avatar should receive the simplified version of the complex avatar; and whereby the client will use the collection of images of the segments of the complex avatar and a collection of depth buffer points for the segments of the complex avatar to render the simplified version of the avatar.

Aspect 19. The method of any of Aspects 1 to 18, wherein generating the avatar assets for the simplified version of the complex avatar, is performed offline using cloud computing resources.

Aspect 20. The method of any of Aspects 1 to 19, further comprising: determining that a client requesting assets making up the complex avatar can support a high-resolution version of the complex avatar; and whereby the client can render some of the complex avatars in the virtual world using the simplified version of the complex avatar.

Aspect 21. The method of any of Aspects 1 to 20, further comprising: determining that the complex avatar does not conform to a humanoid tree of joints; and treating the entire complex avatar as a single segment.

Aspect 22. The method of any of Aspects 1 to 21, further comprising: determining that the complex avatar is non-humanoid, whereby it does not conform to a humanoid tree of joints; playing through all animations for which the non-humanoid complex avatar is capable; and defining a custom tree of joints for the non-humanoid complex avatar.

Aspect 23. The method of any of Aspects 1 to 22, wherein the complex avatar is made up of a high number of polygons, complicated mesh patterns, custom animations, metadata, scripts, or shader properties, etc.

Aspect 24. The method of any of Aspects 1 to 23, wherein the captured images do not include a high number of polygons, complicated mesh patterns, custom animations, metadata, scripts, or shader properties.

Aspect 25. The method of any of Aspects 1 to 24, further comprising: rendering the simplified version of the complex avatar from the captured images of the segment of the complex avatar.

Aspect 26. A method for rendering a simplified version of an avatar, where an original version of the avatar is a complex avatar, the method comprising: determining a current pose of the avatar and a point of view from the perspective of the local player with respect to the avatar; selecting a captured image of an isolated segment from a collection of avatar assets, wherein the selected captured image is associated with the vector from the isolated segment to a virtual camera used to capture the captured image that most closely matches the point of view; generating a square mesh representing a volume of at least a portion of the complex avatar corresponding to the isolated segment; locating the square mesh on top of a skeleton outlined from a tree of joints making up a humanoid avatar; deforming the shape of the square mesh using values from a depth buffer to approximately represent the shape of the isolated segment of the complex avatar; mapping the selected captured image of the isolated segment of the avatar to the square mesh after deforming the shape of the square mesh; and scaling the selected captured image of the isolated segment based on the distance from point of view.

Aspect 27. The method of Aspect 26 further comprising: recursively performing the rendering of the simplified version of the avatar from the collection of avatar assets for each isolated segment of the avatar to render the simplified version of the avatar.

Aspect 28. The method of any of Aspects 26 to 27 further comprising: re-rendering the simplified version of the avatar every frame of a game that includes the avatar.

What is claimed is:

1. A method for generating a simplified version of a complex avatar made up of a plurality of segments, the method comprising:
    isolating segments of the complex avatar from the plurality of segments of a rendered version of the complex avatar, the isolating including a reparent of a first tree joint to become a new root node of the tree joints increasing visibility of the first tree joint, wherein the isolating of the segments comprises:
    scaling one or more portions of the rendered complex avatar where the joints at terminal ends of the segment to be isolated are located to less than 1% scale, thereby collapsing portions of the rendered version of the complex avatar other than the isolated segment into the respective joints at the terminal ends of the isolated segment resulting in a rendering of the isolated segment of the complex avatar;
    for each of the isolated segments, capturing images of the isolated segments of the complex avatar from a variety of directions using a virtual camera, wherein the images of the segments are associated with a vector from the isolated segments to the virtual camera used to capture the image; and
    storing the captured images for each of the isolated segments of the complex avatar along with the vector from the segment to the virtual camera used to capture the image, collectively the captured images make up simplified avatar assets used to render a simplified version of the complex avatar.

2. The method of claim 1, further comprising:
    sampling a depth buffer of points in 3-D space for locations of pixels making up each of the isolated segments of the complex avatar.

3. The method of claim 2, wherein the sampling the depth buffer of points for each of the isolated segments further comprises:
    sampling the depth buffer from a point of view of the virtual camera when capturing the images of the isolated segment of the complex avatar.

4. The method of claim 2, further comprising:
    storing the points on the isolated segment sampled from the depth buffer as part of the simplified avatar assets.

5. The method of claim 1, wherein the capturing the images of the isolated segment of the complex avatar from a variety of directions further comprises:
    moving the isolated segment of the complex avatar into different orientations about the virtual camera.

6. The method of claim 1, wherein the isolating the segment of the complex avatar from the plurality of segments of a rendered version of the complex avatar further comprises:
    selecting the segment of the complex avatar to be isolated from the plurality of segments represented by the tree of joints;
    identify locations of joints at terminal ends of the segment to be isolated onto portions of the rendered version of the complex avatar; and
    reparenting the tree of joints to make one of the joints at the terminal ends of the segment a new root node of the tree of joints.

7. The method of claim 1, further comprising:
determining that a client requesting assets making up the avatar should receive the simplified version of the complex avatar; and
sending the simplified version of the avatar to the client, whereby the client will use the collection of images of the segments of the complex avatar and a collection of depth buffer points for the segments of the complex avatar to render the simplified version of the avatar.

8. The method of claim 1, the method further comprising:
storing the avatar assets making up the complex avatar; and
storing avatar assets making up the simplified version of the complex avatar as a collection of images of the isolated segments of the complex avatar and a collection of depth buffer points for the isolated segments of the complex avatar in an avatar assets database.

9. A non-transitory computer-readable storage medium, the computer-readable storage medium including instructions that when executed by a computer, cause the computer to:
determine a current pose of an avatar and a point of view with respect to the avatar;
select a captured image of an isolated segment from a collection of avatar assets, wherein the selected captured image is associated with a vector from the isolated segment to a virtual camera used to capture the captured image that most closely matches the point of view, wherein the isolating of the segment includes a reparent of a first tree joint to become a new root node of the tree joints increasing visibility of the first tree joint, wherein the isolating of the segments comprises:
scaling one or more portions of a rendered version of the avatar where the joints at terminal ends of the segment to be isolated are located to less than 1% scale, thereby collapsing portions of the rendered version of the avatar other than the isolated segment into the respective joints at the terminal ends of the isolated segment resulting in a rendering of the isolated segment of the avatar;
generate a square mesh representing a volume of at least a portion of a complex avatar corresponding to the isolated segment;
locate the square mesh on top of a skeleton outlined from a tree of joints making up a humanoid avatar;
deform a shape of the square mesh using values from a depth buffer to approximately represent the shape of the isolated segment of the complex avatar;
map the selected captured image of the isolated segment of the avatar to the square mesh after deforming the shape of the square mesh; and
scale the selected captured image of the isolated segment based on a distance from point of view.

10. The computer-readable storage medium of claim 9:
recursively perform a rendering of a simplified version of the avatar from the collection of avatar assets for each isolated segment of the avatar to render the simplified version of the avatar.

11. The computer-readable storage medium of claim 10:
re-render the simplified version of the avatar every frame of a game that includes the avatar.

12. A computing system comprising:
a processor; and
a memory storing instructions that, when executed by the processor, configure an apparatus to:
isolate segments of a complex avatar from a plurality of segments of a rendered version of the complex avatar, the isolating including a reparent of a first tree joint to become a new root node of the tree joints increasing visibility of the first tree joint, wherein the isolating of the segments comprises:
scaling one or more portions of the rendered complex avatar where the joints at terminal ends of the segment to be isolated are located to less than 1% scale, thereby collapsing portions of the rendered version of the complex avatar other than the isolated segment into the respective joints at the terminal ends of the isolated segment resulting in a rendering of the isolated segment of the complex avatar;
generate a simplified version of the complex avatar from captured images of the isolated segments of the complex avatar from a variety of directions using a virtual camera, wherein the images of the segments are associated with a vector from the isolated segments to the virtual camera used to capture the image;
render the simplified version of the complex avatar by determining a current pose of the avatar and a point of view with respect to the avatar, and rendering the images of the isolated segment that are associated with the vector from the isolated segment to a virtual camera used to capture the image that most closely matches the point of view.

13. The computing system of claim 12, wherein the instructions further configure the system to:
isolate segments of the complex avatar from the plurality of segments of a rendered version of the complex avatar;
for each of the isolated segments, capture images of the isolated segments of the complex avatar from a variety of directions using a virtual camera, wherein the images of the segments are associated with a vector from the isolated segments to the virtual camera used to capture the image; and
store the captured images for each of the isolated segments of the complex avatar along with the vector from the segment to the virtual camera used to capture the image, collectively the captured images make up simplified avatar assets used to render a simplified version of the complex avatar.

14. The computing system of claim 12, wherein the instructions further configure the computing system to:
sample a depth buffer of points in 3-D space for locations of pixels making up each of the isolated segments of the complex avatar as part of generating the simplified version of the complex avatar.

15. The computing system of claim 12, wherein the isolating the segment of the complex avatar from the plurality of segments of a rendered version of the complex avatar further comprises:
select the segment of the complex avatar to be isolated from the plurality of segments represented by the tree of joints;
identify locations of joints at terminal ends of the segment to be isolated onto portions of the rendered version of the complex avatar; and
reparent the tree of joints to make one of the joints at the terminal ends of the segment a new root node of the tree of joints.

16. The computing system of claim 12, wherein the instructions further configure the apparatus to:
store assets of the avatar making up the complex avatar; and
store avatar assets making up the simplified version of the complex avatar as a collection of images of the isolated segments of the complex avatar and a collection of depth buffer points for the isolated segments of the complex avatar in an avatar assets database.

17. The computing system of claim 12, wherein the instructions further configure the system to:
determine that a client requesting assets making up the avatar should receive the simplified version of the complex avatar; and
send the simplified version of the avatar to the client, whereby the client will use a collection of images of the segments of the complex avatar and a collection of depth buffer points for the segments of the complex avatar to render the simplified version of the avatar.

18. The computing system of claim 12, wherein the instructions further configure the system to:
select a captured image of an isolated segment from a collection of avatar assets, wherein the selected captured image is associated with the vector from the isolated segment to a virtual camera used to capture the captured image that most closely matches the point of view;
generate a square mesh representing a volume of at least a portion of the complex avatar corresponding to the isolated segment;
locate the square mesh on top of a skeleton outlined from a tree of joints making up a humanoid avatar;
deform a shape of the square mesh using values from a depth buffer to approximately represent the shape of the isolated segment of the complex avatar;
map the selected captured image of the isolated segment of the avatar to the square mesh after deforming the shape of the square mesh; and
scale the selected captured image of the isolated segment based on a distance from point of view.

* * * * *